United States Patent
Hammer (10) Patent No.: US 7,073,716 B2
(45) Date of Patent: Jul. 11, 2006

(54) BARCODE SCANNER WITH DUAL-SURFACE POLYGON

(75) Inventor: Steven J. Hammer, Lilburn, GA (US)

(73) Assignee: NCR Corporation, Dayton, OH (US)

( * ) Notice: Subject to any disclaimer, the term of this patent is extended or adjusted under 35 U.S.C. 154(b) by 167 days.

(21) Appl. No.: 10/656,782

(22) Filed: Sep. 5, 2003

(65) Prior Publication Data

US 2005/0051631 A1    Mar. 10, 2005

(51) Int. Cl.
*G06K 7/10* (2006.01)

(52) U.S. Cl. .............................. 235/462.4; 235/462.36; 235/462.37; 235/462.38; 235/462.39

(58) Field of Classification Search ........... 235/462.36, 235/462.38, 462.39, 454, 462.37, 462.4; 359/217–226, 216
See application file for complete search history.

(56) References Cited

U.S. PATENT DOCUMENTS

| | | | |
|---|---|---|---|
| 3,626,091 A | 12/1971 | Casper | |
| 3,758,187 A * | 9/1973 | Thomas et al. | 369/103 |
| 4,795,224 A | 1/1989 | Goto et al. | |
| 5,268,565 A * | 12/1993 | Katoh et al. | 235/462.31 |
| 5,689,102 A * | 11/1997 | Schonenberg et al. | 235/462.38 |
| 5,821,520 A * | 10/1998 | Mulla et al. | 235/462.27 |
| 5,867,298 A * | 2/1999 | Harrigan et al. | 359/201 |
| 6,292,285 B1 * | 9/2001 | Wang et al. | 359/204 |

FOREIGN PATENT DOCUMENTS

| | | | |
|---|---|---|---|
| JP | 09325290 A | * | 12/1997 |
| JP | 09 325290 A | | 3/1998 |

* cited by examiner

*Primary Examiner*—Thien M. Le
*Assistant Examiner*—Kimberly D. Nguyen
(74) *Attorney, Agent, or Firm*—Paul W. Martin (57) ABSTRACT

A barcode scanner with a dual-surface polygon which increases total scan line length. The polygon includes generally planar walls arranged in a ring having first mirrored facets facing generally towards a center of the ring and second mirrored facets facing generally away from the center of the ring. The first and second mirrored facets direct a laser beam to produce a scan pattern.

18 Claims, 9 Drawing Sheets

BARCODE SCANNER WITH DUAL-SURFACE POLYGON

CROSS REFERENCE TO RELATED APPLICATIONS

The present invention makes reference to the following commonly-assigned U.S. Application:

U.S. application Ser. No. 10/324,228, entitled "Barcode Scanner", filed Dec. 19, 2002.

BACKGROUND OF THE INVENTION

The present invention relates to optical scanners and more specifically to a barcode scanner with a dual-surface polygon.

Optical scanners are well known for their usefulness in retail check out and inventory control. Optical scanners generally employ a laser diode, the light from which is focused and collimated to produce a scanning beam. A mirrored polygon directs the beam against a plurality of stationary mirrors, and collects the beam after it is reflected by an item bearing a barcode label. A motor rotates the mirrored polygon, and a detector receives the returning beam. The pattern produced by such a scanner is characterized by lines oriented at various angles to one another.

The performance of a scanner is related to total scan line length S. Total scan line length S is the sum of the lengths s of all scan lines produced by the scanner.

Individual scan line length s is related to optical path length L and angular coverage $\Theta$ of the scan line, $$s = L \times \Theta.$$

The optical path length L is the distance between the facets and the scanned object. A typical polygon has external facets.

It would be desirable to provide a barcode scanner with a polygon that increases total scan line length S.

SUMMARY OF THE INVENTION

In accordance with the teachings of the present invention, a barcode scanner with a dual-surface polygon is provided.

The barcode scanner includes a polygon including generally planar walls arranged in a ring having first mirrored facets facing generally towards a center of the ring and second mirrored facets facing generally away from the center of the ring. The first and second mirrored facets direct a laser beam to produce a scan pattern.

It is accordingly an object of the present invention to provide a barcode scanner with a dual-surface polygon.

It is another object of the present invention to provide a barcode scanner with a polygon that increases total scan line length.

It is another object of the present invention to provide a barcode scanner with a polygon that increases angular coverage.

It is another object of the present invention to provide a barcode scanner with a polygon that produces more scan lines than a conventional polygon.

BRIEF DESCRIPTION OF THE DRAWINGS

Additional benefits and advantages of the present invention will become apparent to those skilled in the art to which this invention relates from the subsequent description of the preferred embodiments and the appended claims, taken in conjunction with the accompanying drawings, in which:

DETAILED DESCRIPTION OF THE PREFERRED EMBODIMENT

Figure 1:
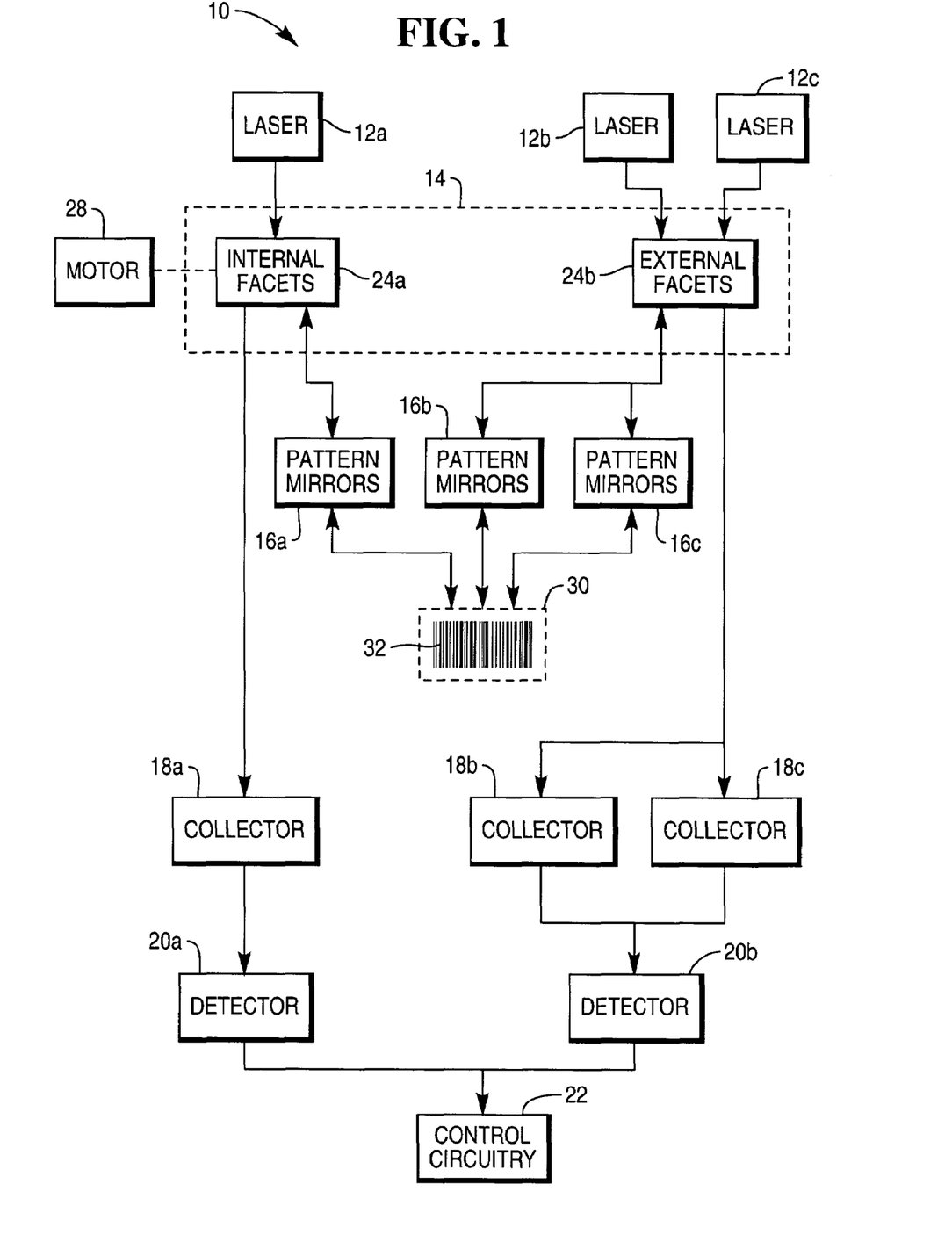
FIG. 1 is a block diagram of an optical scanner with a dual-surface polygon.

Referring to FIG. 1, scanner 10 primarily includes lasers 12a–12c, dual-surface polygon 14, pattern mirrors 16a–16c, collectors 18a–18c, detectors 20a–20b, and control circuitry 22.

Lasers 12a–12c produce laser beams. Lasers 12a–12c include a laser as well as collimating elements. Laser 12a is scanned off of internal facets 24a of polygon 14, while lasers 12b–12c is scanned off of external facets 24b of polygon 14.

Dual-surface polygon 14 directs the laser beams towards patter mirrors 16a–16c and directs captured light reflected from item 30 towards collectors 18a–18c. Specifically, internal facets 24a face generally inward towards a center of polygon 14 and direct a laser beam from laser 12a towards pattern mirrors 16a. External facets 24b face generally outward and away from the center of polygon 14 and direct laser beams from lasers 12b–12c towards pattern mirrors 16b–16c, respectively.

Collection occurs in reverse. Internal facets 24a direct collected light towards collector 18a. Collector 18a directs collected light towards detector 20a. External facets 24b direct collected light towards collectors 18b–18c. Collectors 18b–c direct collected light towards detector 20b.

Motor 28 rotates dual-surface polygon 14.

Pattern mirrors 16a–16c direct the laser beams towards barcode 32 of item 30 as scan lines. Pattern mirrors 16a–16c also capture the light reflected from item 30 and direct it to dual-surface polygon 14.

Collectors 18a–18c collect the reflected light and focus it on detectors 20a–20b. Specifically, collector 18a collects light from internal facets 24a and focus it on detector 20a. Collectors 18b–18c collect light from external facets 24b and focus it on detector 20b.

Detectors 20a–20b produce electrical signals from the collected light.

Control circuitry 22 controls operation of scanner 10 and decodes barcode information in the electrical signals from detectors 20a–20b.

As described, scanner 10 provides substantial power and performance, but the present invention also envisions fewer components combined with polygon 14. In the present embodiment, three lasers 12a–12c could be replaced by a single laser and a beam splitter. Polygon 14 may be employed in other scanners using fewer components, such as a single laser, a single set of pattern mirrors, a single collector, and a single detector.

With reference to FIGS. 2–6, scanner 10 is shown in more detail.

Scanner 10 includes perimeter walls 34. Dimensions of scanner 10 are approximately six and a half inches in width, six and a half inches in length, and three inches in depth.

Scanner 10 also includes aperture 36 in the outer surface of scanner 10. Aperture 36 is approximately four inches wide and five inches long, with length aligned to the scan path.

Scanner 10 may be mounted in a checkout counter in horizontal fashion, or mounted above the checkout counter in a vertical fashion as a presentation scanner. When mounted in horizontal fashion, scanner 10 may be equipped with a load cell assembly. If so, aperture 36 would be part of a weigh plate.

Polygon 14 rotates around laser 12a and collector 18a. Polygon 14 is mounted with its centerline generally parallel to aperture 36 for compactness and for proper scan line orientation. Polygon 14 is shown with eight generally planar walls 70 arranged in a ring 74, although other polygon shapes are also envisioned. Each of the eight walls 70 is oriented at a different angle from base 72 to increase coverage in the scan volume. In the illustrated embodiment, the angles are all obtuse. Internal facets 24a of walls 70 face generally towards the center of polygon 14. External facets 24b of walls 70 face generally away from the center of polygon 14.

Internal laser 12a and collector 18a may be located within ring 74. Laser 12a and collector 18a are stationary. The laser beam from laser 12a passes through an aperture 40a in collecting mirror 18a.

External laser 12b and collector 18b are mounted on one side of polygon 14 and external laser 12c and collector 18c are mounted on the other. Collectors 18b and 18c include apertures 40b and 40c through which laser beams from their respective laser passes.

Internal pattern mirrors 16a are mounted in front of polygon 14 so as to form a partial shell or cone. Internal pattern mirrors 16a preferably include three mirrors, a center mirror 42, a left side mirror 44, and a right side mirror 46. Mirrors 44–46 are oriented at approximately the same angle from mirror 42. Mirror 42 produces a substantially horizontal scan line. Mirrors 44 and 46 produce diagonal scan lines.

External pattern mirrors 16b and 16c each preferably include three mirrors. Pattern mirrors 16b include mirrors 48, 50, and 52 oriented at different angles to one another. Pattern mirrors 16c include mirrors 54, 56, and 58 oriented at different angles to one another.

Mirrors 48 and 54 produce substantially vertical scan lines. Mirrors 50 and 56 produce diagonal scan lines. Mirrors 52 and 58 produce diagonal of scan lines.

Internal and external pattern mirrors 16a–16c direct their laser beams toward secondary mirror 60. Secondary mirror 60 directs the laser beams up and out of scanner 10 to form a scan pattern above scanner 10. Secondary mirror 60 also collects reflected light from scanned item 30 and directs it to internal and external pattern mirrors 16a–16c.

Figure 3:
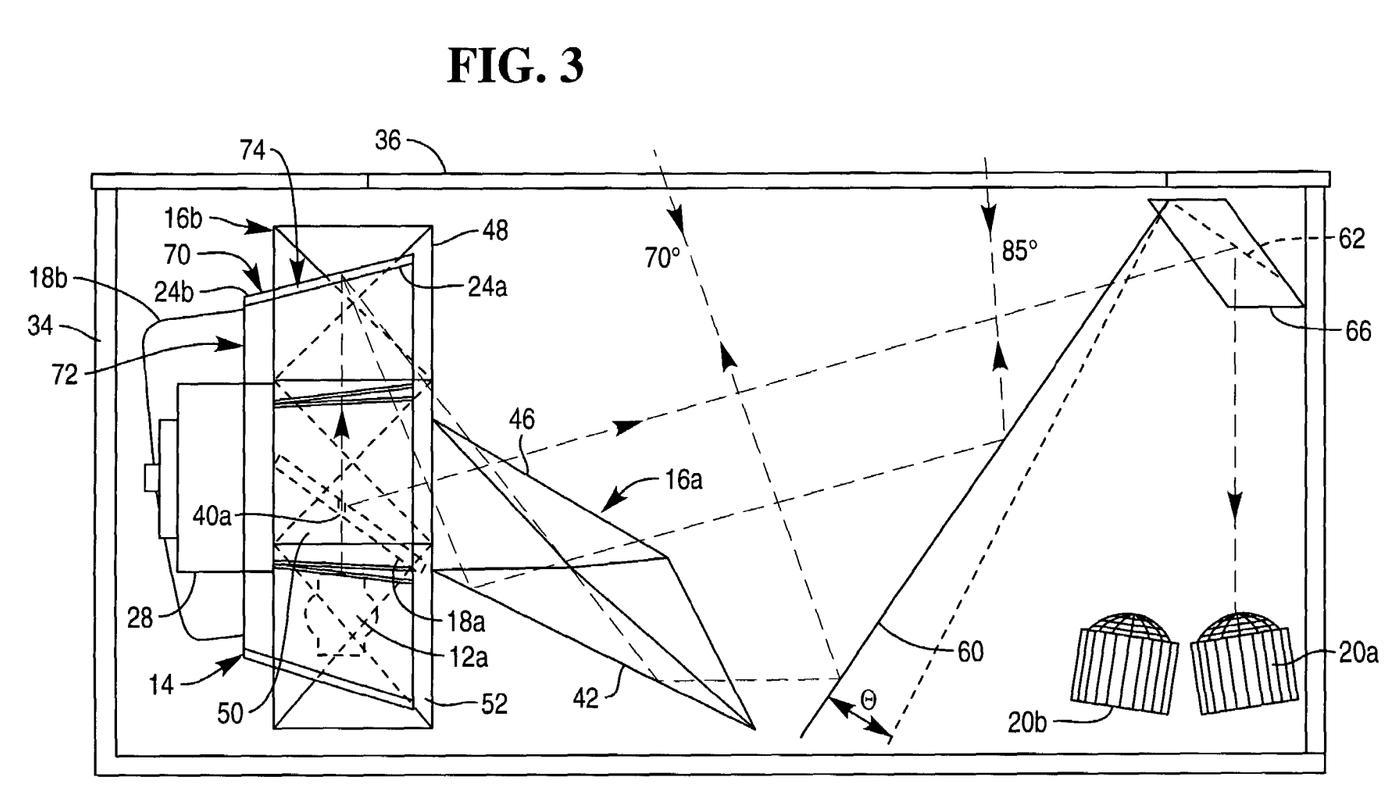
FIG. 3 is a right side view of the optical scanner in a first configuration and showing laser beam paths from the inner spinner facets.
Figure 4:
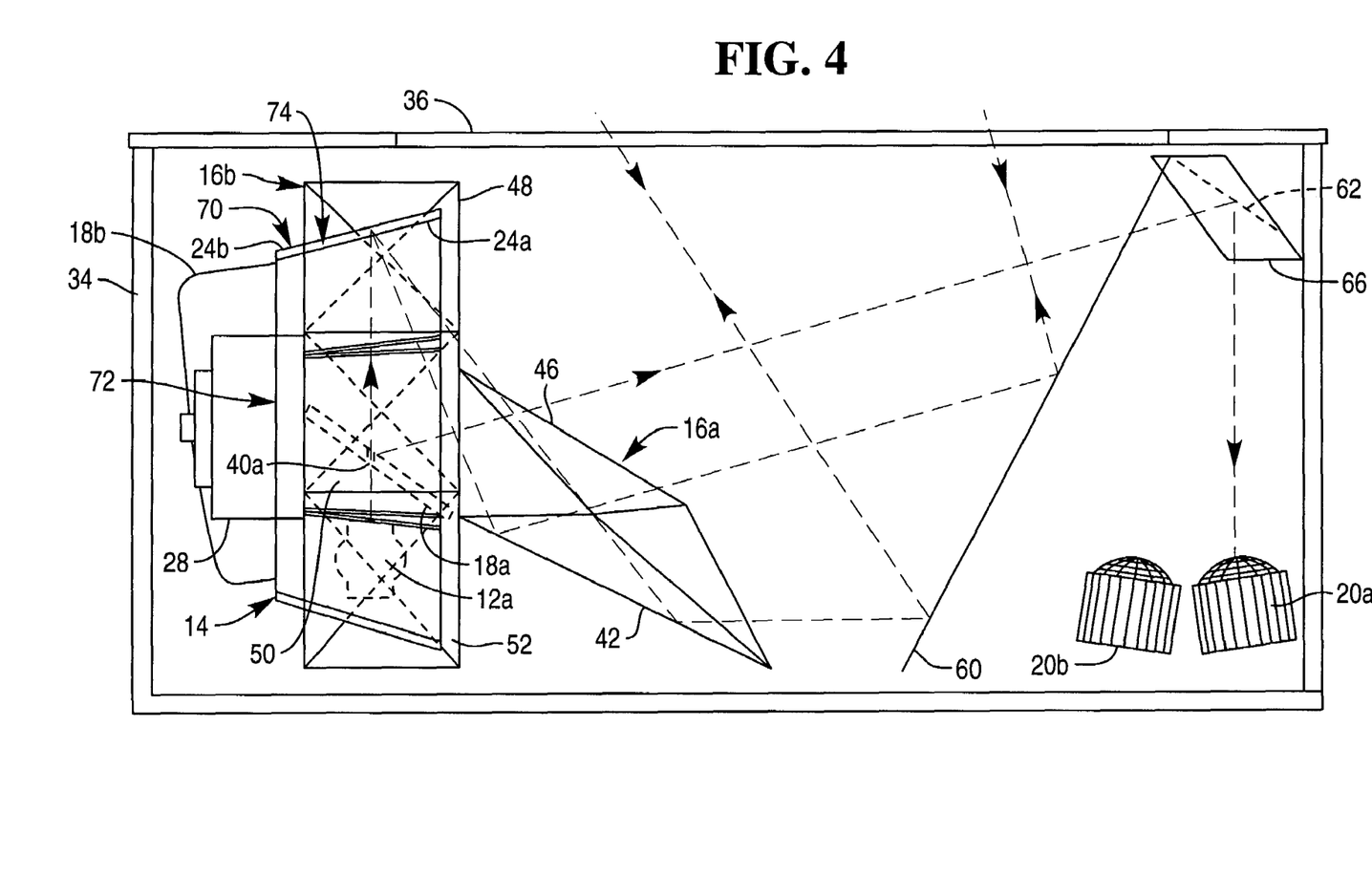
FIG. 4 is a right side view of the optical scanner in a second configuration and showing laser beam paths from the inner spinner facets.

With reference to FIGS. 3 and 4, secondary mirror 60 is a large, angularly adjustable, plano-mirror used to optimize the exiting angle of the scanner's entire pattern for maximum performance in either the vertical or horizontal scan modes.

In the vertical scan mode (FIG. 3), the exiting angle is preferably about seventy degrees to eighty-five degrees. Secondary mirror 60 is oriented about Θ degrees shallower than in the horizontal mode of operation, where Θ is preferably about fifteen degrees.

In the horizontal scan mode (FIG. 4), the exiting angle is preferably about fifty-five degrees to seventy degrees.

Reflecting mirror 62 directs collected light from collector 18a to detector 20a. Reflecting mirrors 64 and 66 direct collected light from collectors 18b and 18c to detector 20b. Lasers 12b and 12c are multiplexed in order to share detector 20b.

FIGS. 2–5 also illustrate some of the ray paths for creating the scan pattern.

Figure 2:
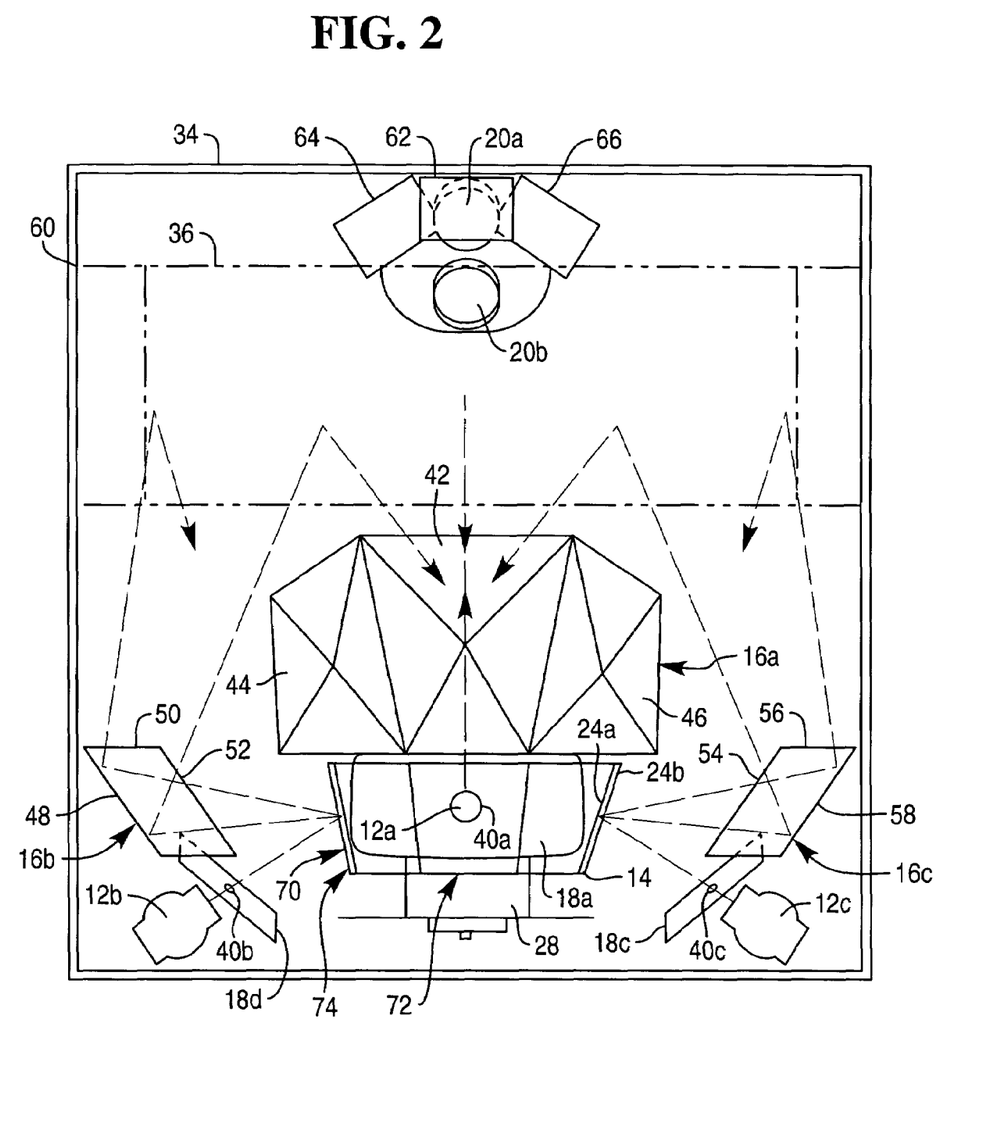
FIG. 2 is a top view of the optical scanner with the lid removed and showing laser beam paths.
Figure 5:
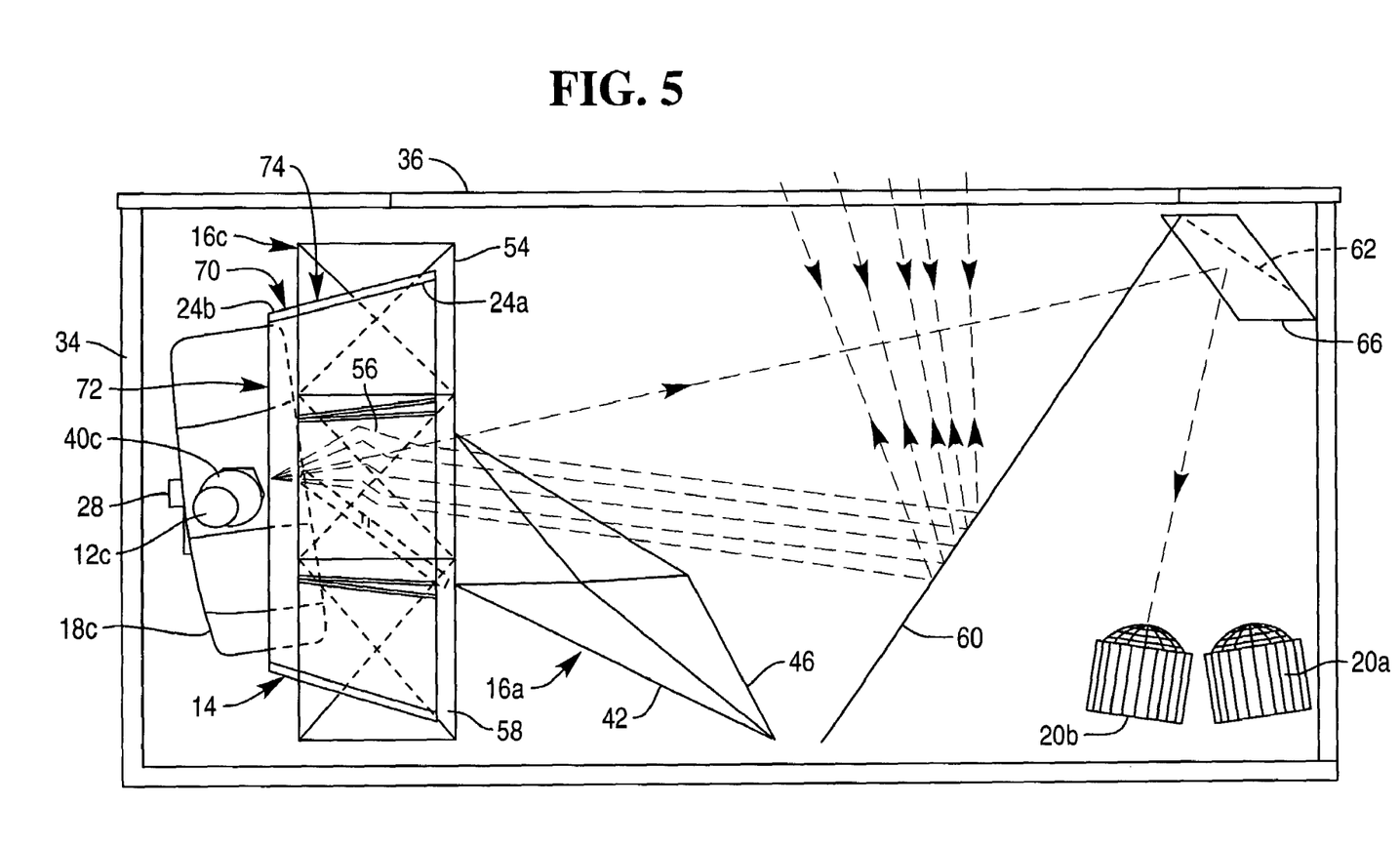
FIG. 5 is a right side view of the optical scanner showing laser beam paths from the external spinner facets.
Figure 6:
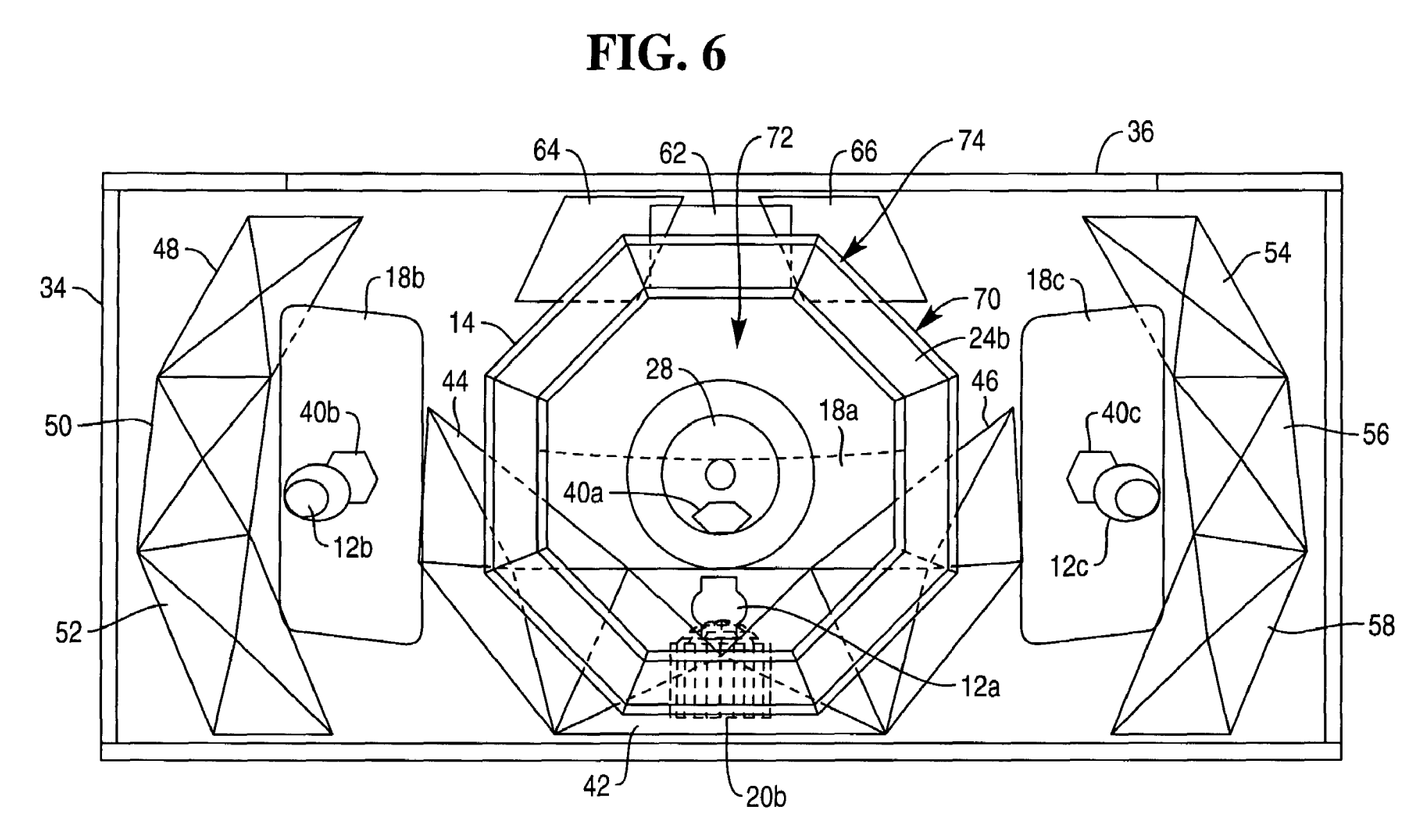
FIG. 6 is an end view of the optical scanner.

FIG. 2 illustrates some of the ray paths from all three of lasers 12a–12c. FIGS. 3 and 4 illustrate some of the ray paths from laser 12a for vertical and horizontal modes of operation, respectively. FIG. 5 illustrates some of the ray paths from laser 12c.

With reference to FIGS. 7a–7d, the scan pattern produced by scanner 10 is illustrated in detail.

Figure 7A:
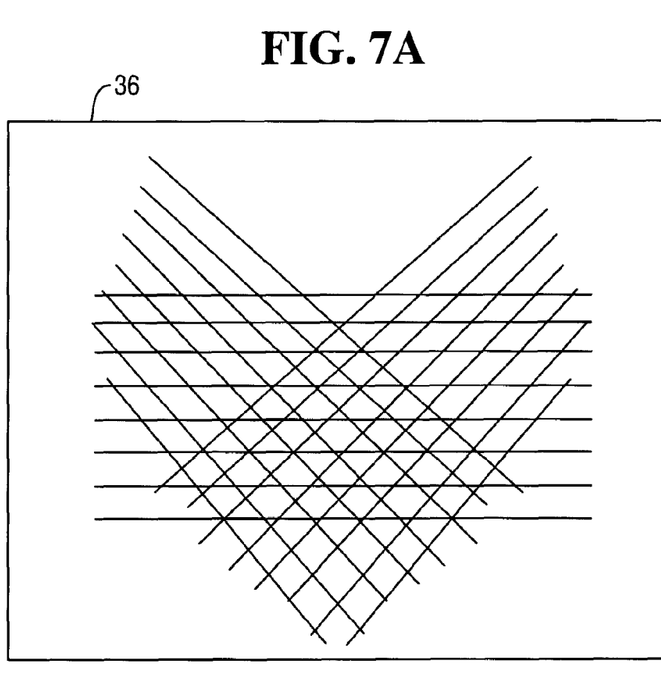
FIGS. 7a–7d are views of the scan pattern produced by the optical scanner.

FIG. 7a represents a partial scan pattern created by laser 12a and internal pattern mirrors 16a. This partial scan pattern includes three sets of eight lines.

Figure 7B:
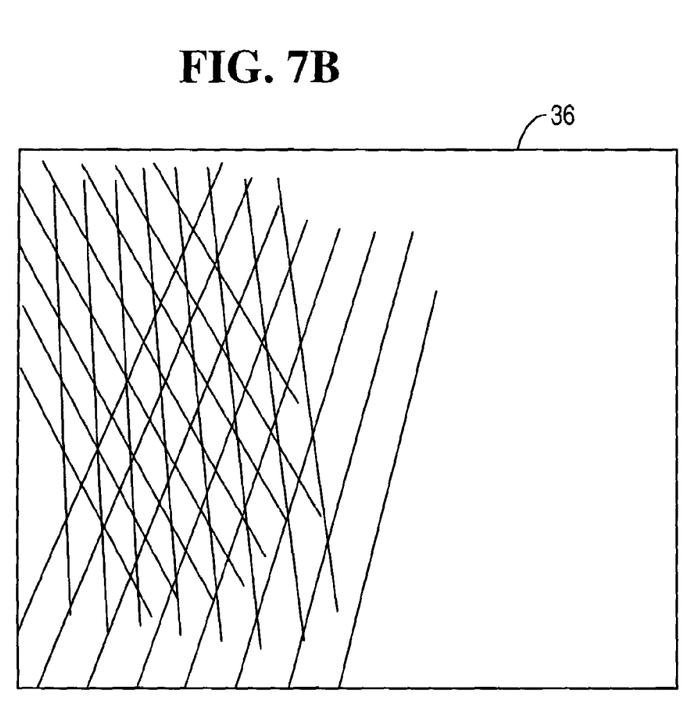

FIG. 7b represents a partial scan pattern created by laser 12b and external pattern mirrors 16b. This partial scan pattern includes three sets of eight lines.

Figure 7C:
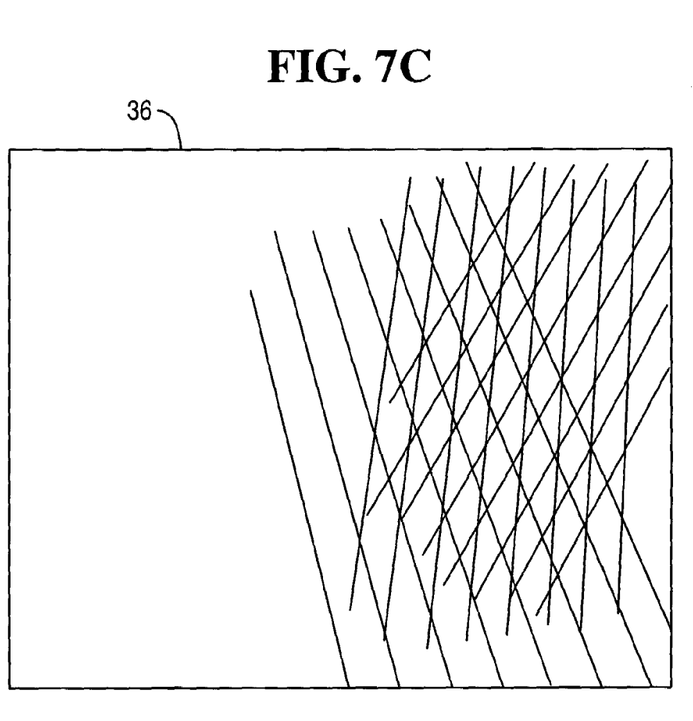

FIG. 7c represents a partial scan pattern created by laser 12c and external pattern mirrors 16c. This partial scan pattern includes three sets of eight lines.

Figure 7D:
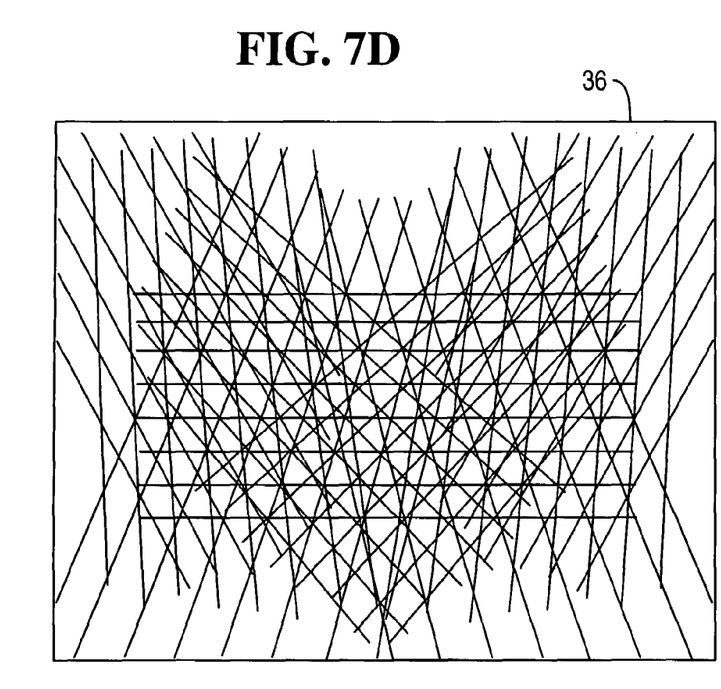

FIG. 7d represents a complete scan pattern combining the partial scan patterns of FIGS. 7a–7c. The complete scan pattern includes 72 scan lines and line length on deck is about two hundred and thirty inches. Additional scan lines may be produced by increasing the number and orientations of pattern mirrors 16a–16c.

Figure 8:
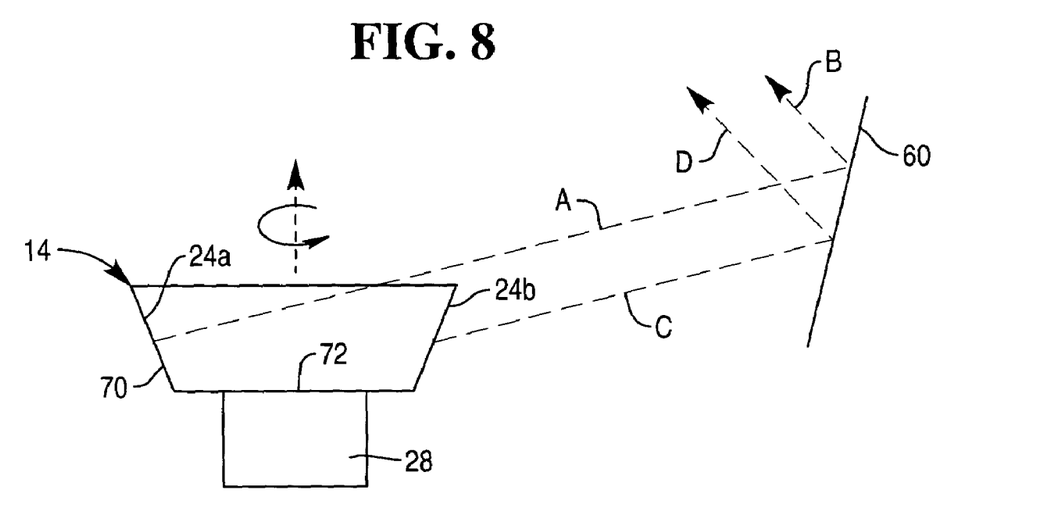
FIG. 8 is a diagrammatic view illustrating the increase in optical path length created by the optical scanner.

With reference to FIG. 8, the advantages associated with use of polygon 14 are made clear.

A laser beam from internal facets 24a includes sections A and B. The optical path length $L_i$ produced by an individual facet 24b is $$L_i = A + B.$$

A laser beam from external facets 24b includes sections C and D. The optical path length $L_e$ produced by an individual facet 24b is $$L_e = C + D.$$

The combined optical path length L equals the sums of the individual optical path lengths $L_i$ and $L_e$:

$$L = A + B + C + D.$$

Therefore, the total scan line length is:

$S = (A+B+C+D) \times \phi$, where $\phi$ is the number of radians subtended by individual facets 24a and 24b. The illustrated embodiment produces a total scan line length of about 240 inches which is the sum of all the individual scan line lengths on the window.

Since two facets, one internal and one external, simultaneously produce scan lines, dual-surface polygon 14 also produces twice as many scan lines as a polygon with only one reflecting surface.

Also, angular coverage is increased. Internal and external mirror facets 24a and 24b combine to produce more output beam angles from an increased number of different input beam angles.

Polygon 14 facilitates compact optical design, greater optical path length, and greater coverage within the scan volume.

Although the invention has been described with particular reference to certain preferred embodiments thereof, variations and modifications of the present invention can be effected within the spirit and scope of the following claims.

What is claimed is:

1. A barcode scanner comprising:
   a polygon including planar walls arranged in a ring having first mirrored facets facing generally towards a center of the ring and second mirrored facets facing generally away from the center of the ring;
   a first laser mounted inside the ring for producing a first laser beam;
   a first collector mounted inside the ring for collecting first light reflected from an item;
   a second laser mounted outside the ring for producing a second laser beam;
   a second collector mounted outside the ring for collecting second light reflected from the item;
   a number of detectors for converting the first and second light from the first collector into electrical signals; and
   pattern mirrors for creating a scan pattern from the first and second laser beams;
   wherein the first mirrored facets direct the first laser beam towards the pattern mirrors and direct the first light towards the first collector; and
   wherein the second mirrored facets direct the second laser beam towards the pattern mirrors and direct the second light towards the second collector.

2. The barcode scanner of claim 1, wherein the polygon comprises eight walls, including eight first mirrored facets and eight second mirrored facets.

3. The barcode scanner of claim 1, wherein the polygon rotates.

4. The barcode scanner of claim 3, further comprising:
   a motor for rotating the polygon.

5. The barcode scanner of claim 1, wherein the pattern mirrors comprise:
   a first group of pattern mirrors for reflecting the first laser beam; and
   a second group of pattern mirrors for reflecting the second laser beam.

6. The barcode scanner of claim 1, further comprising:
   a third laser mounted outside the ring for producing a third laser beam; and
   a third collector mounted outside the ring for collecting third light reflected from the item.

7. The barcode scanner of claim 6, wherein the pattern mirrors comprise:
   a first group of pattern mirrors for reflecting the first laser beam;
   a second group of pattern mirrors for reflecting the second laser beam; and
   a third group of pattern mirrors for reflecting the third laser beam.

8. The barcode scanner of claim 6, wherein the pattern mirrors comprise:
   a first primary pattern mirror for reflecting the first laser beam;
   a second primary pattern mirror for reflecting the second laser beam;
   a third primary pattern mirror for reflecting the third laser beam; and
   a secondary pattern mirror for reflecting the first, second, and third laser beams to produce the scan pattern.

9. The barcode scanner of claim 1, wherein the pattern mirrors comprise:
   a rotatable pattern mirror for adjusting the scan pattern.

10. The barcode scanner of claim 1, wherein the pattern mirrors comprise:
    a first primary pattern mirror for reflecting the first laser beam;
    a second primary pattern mirror for reflecting the second laser beam; and
    a secondary pattern mirror for reflecting the first and second laser beams to produce the scan pattern.

11. The barcode scanner of claim 10, wherein the secondary pattern mirror is rotatable for adjusting the scan pattern.

12. The barcode scanner of claim 1, further comprising:
    control circuitry for obtaining barcode information from the electrical signals from the number of detectors.

13. The barcode scanner of claim 1, wherein the number of detectors comprise first and second detectors.

14. The barcode scanner of claim 1, wherein the first detector converts the first light into first electrical signals and the second detector converts the second light into second electrical signals.

15. A barcode scanner comprising:
    a polygon including generally planar walls having first mirrored facets arranged in a ring facing generally towards a center of the ring and second mirrored facets facing generally away from the center of the ring;
    a first laser mounted inside the ring for producing a first laser beam;
    a first collector mounted inside the ring for collecting first lightreflected from an item;
    a second laser mounted outside the ring and to a first side of the polygon for producing a second laser beam;
    a second collector mounted outside the ring and to the first side of the polygon for collecting second light reflected from the item;
    a third laser mounted outside the ring and to a second side of the polygon for producing a third laser beam;
    a third collector mounted outside the ring and to the third side of the polygon for collecting third light reflected from the item;
    a first detector for converting the first light from the first collector into first electrical signals;
    a second detector for converting the second and third light from the second and third collectors into second and third electrical signals;
    a first primary pattern mirror for reflecting the first laser beam;
    a second primary pattern mirror for reflecting the second laser beam;
    a third primary pattern mirror for reflecting the third laser beam; and
    a secondary pattern mirror for reflecting the first, second, and third laser beams to produce the scan pattern;
    wherein the first mirrored facets direct the first laser beam towards the first primary pattern mirror and direct the first light towards the first collector;
    wherein the second mirrored facets direct the second laser beam towards the second primary pattern mirror and direct the second light towards the second collector; and
    wherein the second mirrored facets direct the third laser beam towards the third primary pattern mirror and direct the third light towards the second collector.

16. A barcode scanner comprising:
    a housing having an aperture;
    a polygon in the housing at a first end having a centerline oriented generally parallel to the aperture and including generally planar walls arranged in a ring having first mirrored facets facing generally towards the centerline and second mirrored facets facing generally away from the centerline;

a first laser mounted inside the ring for producing a first laser beam;

a first primary collector mounted inside the ring for collecting first light reflected from an item;

a second laser in the housing and adjacent the second mirrored facets of the facets for producing a second laser beam;

a second primary collector in the housing and adjacent the second mirrored facets of the facets for collecting second light reflected from the item;

a first secondary collector at a second end of the housing opposite the first end of the housing for reflecting light from the first primary collector;

a second secondary collector at the second end of the housing for reflecting light from the second primary collector;

a number of detectors at the second end of the housing for converting the first and second light from the first and second secondary collectors into electrical signals;

first primary pattern mirrors in the housing adjacent the first mirrored facets of the ring for reflecting the first laser beam;

second primary pattern mirrors in the housing adjacent the second mirrored facets of the ring for reflecting the second laser beam; and a secondary pattern mirror at the second end of the housing for reflecting the first and second laser beams through the aperture to produce the scan pattern;

wherein the first mirrored facets direct the first laser beam towards the first primary pattern mirrors and direct the first light towards the first primary collector; and wherein the second mirrored facets direct the second laser beam towards the second primary pattern mirrors and direct the second light towards the second primary collector.

17. A method of scanning an item having a barcode label comprising the steps of:

directing a first laser beam at inward facing mirrored facets of a ring of walls of a polygon;

directing a second laser beam at outward facing mirrored facets of the ring;

reflecting the first laser beam by the inward facing mirrored facets to form first scan lines of a scan pattern; and reflecting the second laser beam by the outward facing mirrored facets to form second scan lines of a scan pattern.

18. A method of scanning an item having a barcode label comprising the steps of:

directing a first laser beam at inward facing mirrored facets of a ring of walls of a polygon;

directing a second laser beam at outward facing mirrored facets of the ring;

reflecting the first laser beam by the inward facing mirrored facets towards a first set of pattern mirrors;

reflecting the second laser beam by the outward facing mirrored facets towards a second set of pattern mirrors;

reflecting the first laser beam by the first set of pattern mirrors to form first scan lines of a scan pattern;

reflecting the second laser beam by the second set of pattern mirrors to form second scan lines of the scan pattern;

collecting first light from the item by the first set of pattern mirrors;

collecting second light from the item by the second set of pattern mirrors;

directing the first light towards the inward facing mirrored facets of the polygon by the first set of pattern mirrors;

directing the second light towards the outward facing mirrored facets of the polygon by the second set of pattern mirrors;

reflecting the first light towards a first collector inside the ring by the inward facing mirrored facets of the polygon;

reflecting the second light towards a second collector outside the ring by the outward facing mirrored facets of the polygon;

directing the first light towards a first detector by the first collector;

directing the second light towards a second detector by the second collector;

converting the first light into first electrical signals by the first detector;

converting the second light into second electrical signals by the second detector; and obtaining barcode label information from the first and second electrical signals by control circuitry.

* * * * *